United States Patent [19]
Bogdan

[11] Patent Number: 5,119,959
[45] Date of Patent: Jun. 9, 1992

[54] HIGH PRESSURE VESSEL

[76] Inventor: Lazarevic Bogdan, Mose Pijade 124/17, 26000 Pancevo, Yugoslavia

[21] Appl. No.: 636,682

[22] Filed: Jan. 2, 1991

[51] Int. Cl.⁵ .............................................. B65D 25/04
[52] U.S. Cl. .................... 220/585; 220/566; 220/506
[58] Field of Search ............... 220/581, 585, 506, 564, 220/566, 85 F, 23.83

[56]  References Cited

U.S. PATENT DOCUMENTS

| | | | |
|---|---|---|---|
| 663,732 | 12/1900 | Couglin | 220/23.83 |
| 1,576,955 | 3/1926 | Dubraks | 220/506 |
| 2,131,753 | 10/1938 | Reid | 220/585 |
| 2,250,250 | 7/1941 | Brooks | 220/506 |
| 2,746,634 | 5/1956 | Smith | 220/23.83 |
| 2,802,332 | 8/1957 | Orsino | 220/506 |
| 3,024,938 | 3/1962 | Watter | 220/581 |
| 3,282,459 | 11/1966 | Wilson | 220/585 |
| 3,414,153 | 12/1968 | LeRoux | 220/506 |
| 3,903,931 | 9/1975 | Moulin et al. | 220/581 |
| 4,182,254 | 1/1980 | Secord | 220/564 |
| 4,715,186 | 12/1987 | Ishimaru et al. | 220/506 |

FOREIGN PATENT DOCUMENTS 0228433 10/1959 Australia ........................... 220/585

Primary Examiner—Stephen Marcus
Assistant Examiner—S. Castellano
Attorney, Agent, or Firm—Richard C. Litman

[57]  ABSTRACT

A high pressure vessel assembly includes a central pivot tank and coaxial or concentrically disposed tanks for liquid or gas storage with or without gaseous phase cooling. The pivot tank comprises a cylindrically shaped wall having torus-shaped ends and is surrounded by an annularly shaped internal tank having internal and external walls with the former being joined to the pivot tank by bands adjacent the tank ends to provide an intermediate chamber. A larger diameter external tank likewise of annular configuration, surrounds the internal tank and is also joined thereto in a manner providing an intermediate chamber. A fitting projecting from the ends of all three tanks at one end of the assembly permits filling or emptying of the respective tanks while a separate discharge pipe projecting from the internal and external tank ends communicates with the two chambers to carry away any fluid leaking from the juxtaposed peripheral walls of the tanks.

2 Claims, 2 Drawing Sheets

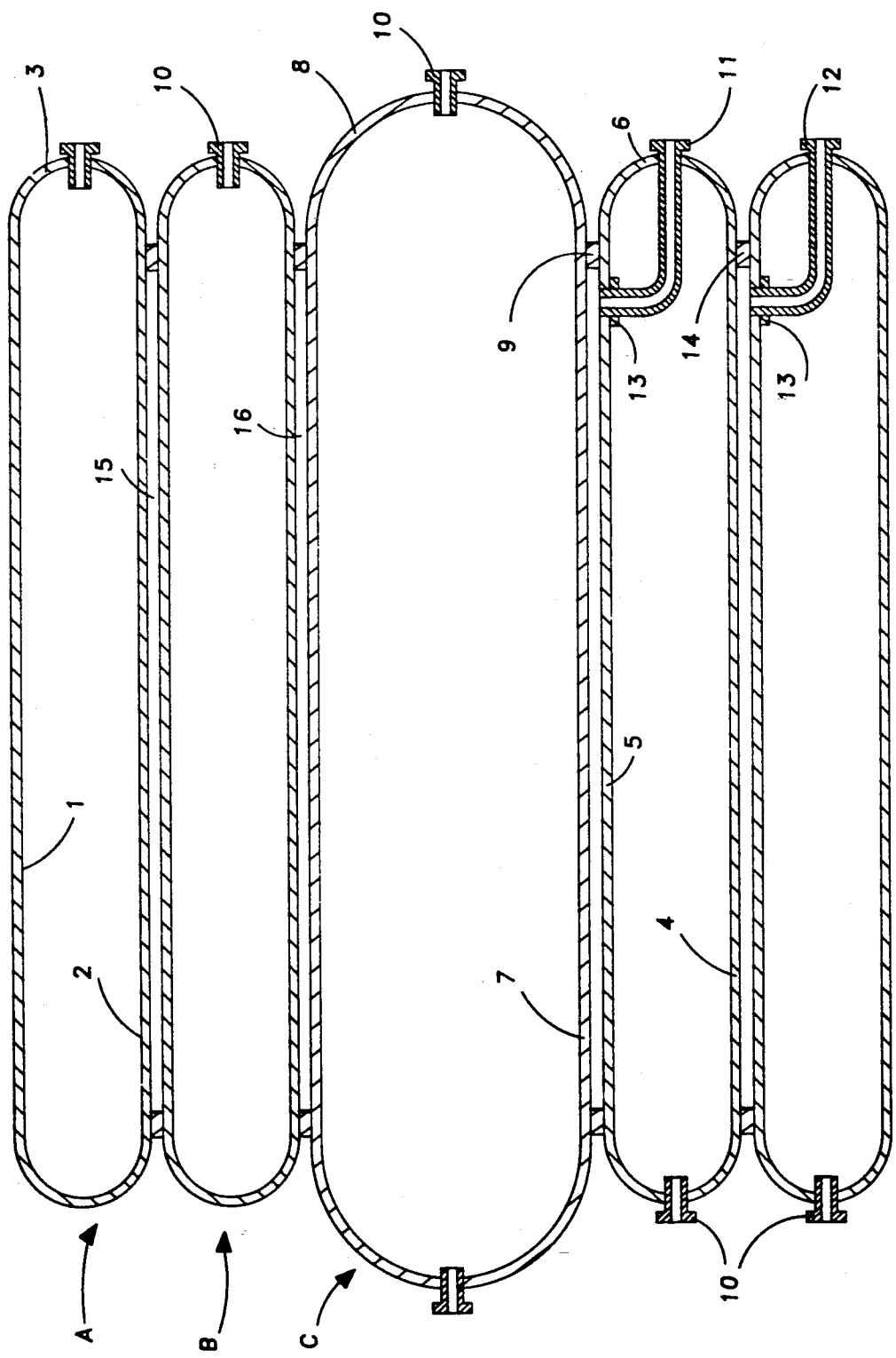

HIGH PRESSURE VESSEL

FIELD OF THE INVENTION

A high pressure vessel is proposed for liquid and gas storage under pressure with or without cooling. The vessels can be installed on trucks, railway cars, ships, submarines, airplanes, space shuttles as well as serving as stationary tanks in various fields of industry.

DESCRIPTION OF THE PRIOR ART

The existing vessels for liquid and gas storage are shaped as a sphere, cylinder, spheroid or their combination, and are installed on railway cars, trucks, airplanes, space shuttles and as stationary tanks in various fields of industry. Vessel walls are designed according to the estimated pressures and temperatures, diameters and allowed material stresses, as well as to construction quality requirements and safety ratio, respecting the purpose and construction location. These conventional solutions for high pressures and large dimensions are not economical due to large wall dimensions. This problem is partially solved by cooling the gaseous phase which results by lowering the estimated pressure. Using this procedure some fluids cannot be economically stored and transported.

SUMMARY OF THE INVENTION

High pressure liquid and gas storage and transportation requiring minimum costs of construction and maintenance, cooling energy consumption and minimum weight, is accomplished by the provision of a tank assembly comprising a plurality of concentrically disposed elongated tanks. A central pivot tank is surrounded respectively, by an internal lank and an external tank with the plurality of tanks being joined to one another in a manner providing an annular chamber hermetically sealed therebetween Leakage of liquid or gas due to cracking of the juxtaposed tanks is recovered from the annular chambers by means of discharge pipes providing communication between the chambers and the exterior.

BRIEF DESCRIPTION OF THE DRAWINGS

FIG. 2 is a longitudinal sectional view, taken along the line A—A of FIG. 1.

Similar reference characters designate corresponding elements throughout the several views of the drawings.

DETAILED DESCRIPTION OF THE PREFERRED EMBODIMENT

Figure 1:
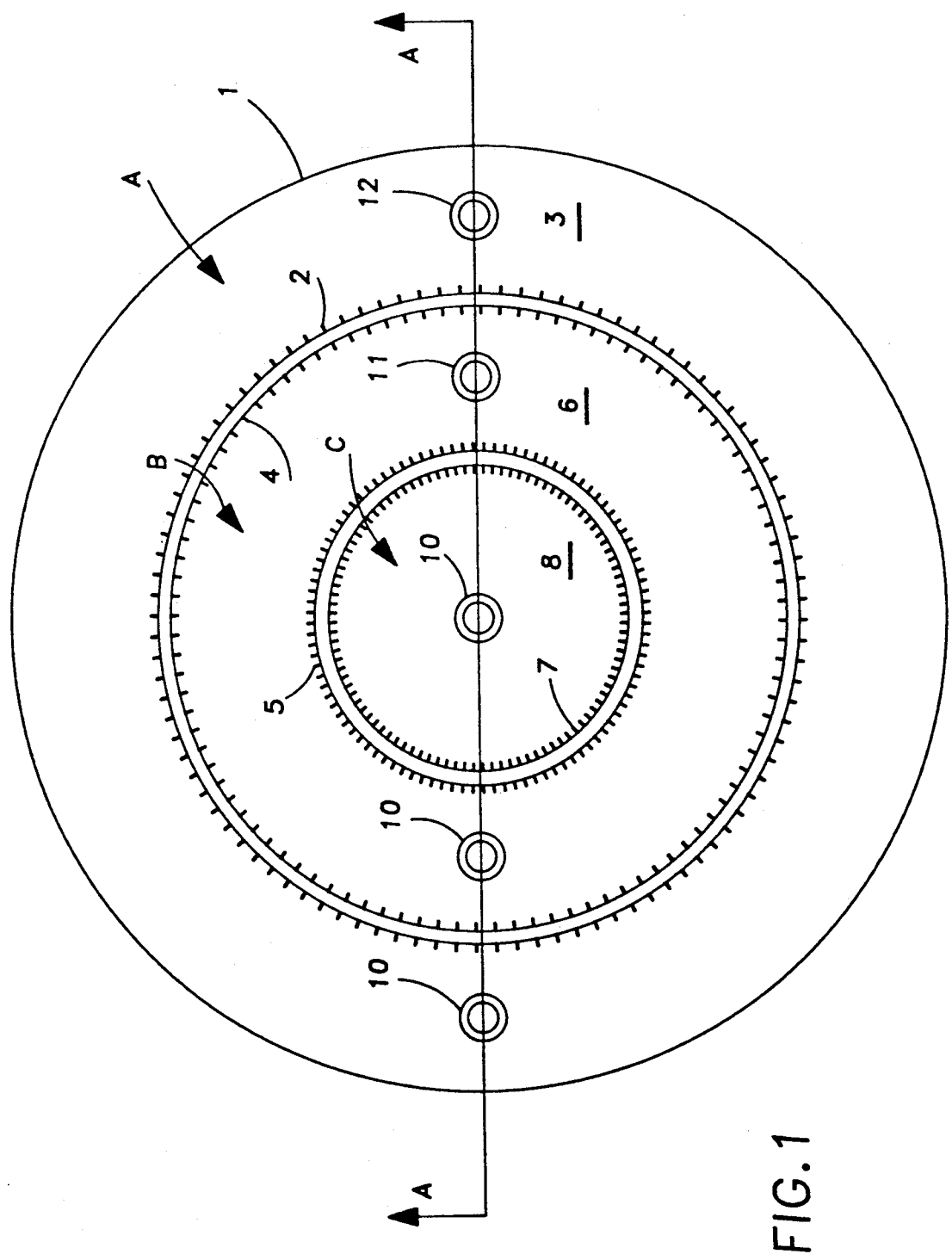
FIG. 1 is an end elevation of a high pressure vessel according to the present invention.

The high pressure vessel consists of a central, pivot tank and several coaxial or concentric tanks connected together to contain a compressed fluid economically and safely. As will be seen in FIG. 1 and FIG. 2, the vessel comprises an external annular tank A having a circular external shell or wall 1 radially spaced from an internal shell or wall 2 and bounded by a torus-shaped end or bottom S. Concentrically disposed within the external tank A is the internal tank B having a circular external shell or wall 4 radially spaced from an internal shell or wall 5 and likewise bounded by a torus-shaped end or bottom 6. The respective walls 2 and 4 will be seen to be spaced from one another to provide an intermediate annular chamber 15 bounded by opposite spacing/sealing bands 14 adjacent each of the two ends 2 and 6 of the tanks A and B.

Located within the internal tank internal wall 5 is a central or pivot lank C having a round or cylindrical shell or wall 7 which is likewise radially spaced inwardly of the internal tank internal wall 5 to provide a chamber 16 bounded by opposite spacing/sealing bands 9 adjacent each of the two tank ends B, the latter of which are hemispherical. All three tanks will be seen to define an elongated structure wherein their length is substantially greater than their respective internal diameters.

Each tank A, B and C is provided with a fitting 10 welded at a tank end 3, 6 and 8 respectively, and which comprises a coupling or valve by which each tank may be filled or emptied, either by individual pipe lines or alternatively, by manifold piping (not shown). Also, as shown most clearly in FIG. 2 of the drawings, a discharge pipe 11 projects from an end wall 6 of the internal tank 8 and communicates through the tank interior to the chamber 16 while another discharge pipe 12 projects from an end wall 3 of the external tank A and communicates through its interior to the chamber 15. Each discharge pipe 11,12 is suitably sealed and affixed to the respective tank wall by means of a saddle 13. These discharge pipes 11,12 will be seen to be positioned at the lower reaches of the respective chambers 16,15 so as to provide full drainage of any fluid leaking into the chambers. Preferably, a fitting 10 for each of the three tanks A and C are located at a common end of the assembly while the two discharge lines 11,12 are located at the same end of the assembly. Also, by aligning all of the fittings and discharge pipes as shown in the drawings, a standardized arrangement is provided that greatly facilitates servicing of the assembly.

Radial deformations of the external tank internal wall 2 and internal tank external wall 4 are small, as well as are the corresponding stresses. Likewise, radial deformations of internal tank external wall 5 and the pivot lank wall 7 are small, as well as are the corresponding stresses. Radial deformation of the external tank external wall 1 depends on fluid pressure, the ring diameter and the wall thickness. The corresponding stresses must not exceed the allowed limits at a certain temperature. Axial deformations and corresponding stresses of all tank walls depend on the tank cross-sections, pressure and thickness of the walls and tank ends, and they are authoritative for the lightest vessel design. The high pressure vessel can be used together with gaseous phase cooling for storage of fluids which have not been stored in this manner before and for all the other storages, thus providing constructive savings of material and cooling energy.

I claim:

1. A vessel for the storage of liquids or gasses under high pressure comprising:
    a central tank having an elongated cylindrical wall enclosed by opposite ends, said opposite ends being curved in longitudinal cross-section,
    an internal tank concentrically disposed about said central tank and having circular internal and external walls defining an axial extending substantially comparable to the axial extent of said central tank cylindrical wall, said internal tank defining a curved configuration in end elevation, there further being opposite ends enclosing said internal tank and defining a curved configuration in longitudinal cross-section, spacer means adjacent each said central tank opposite end sealingly joining said internal tank internal wall to said central tank wall and defining a first annular chamber therebetween, and having a first lower reach therein, an external tank concentrically disposed about said internal tank and having circular internal and external walls defining an axial extend substantially comparable to the axial extent of said central tank cylindrical wall, said external tank defining a curved configuration in end elevation, there further being opposite ends enclosing said external tank and defining a curved configuration in longitudinal cross-section, spacer means adjacent each said internal tank opposite end sealingly joining said external tank internal wall to said internal tank external wall and defining a second annular chamber therebetween, and having a second lower reach therein, fittings projecting from at least one said end of each said central, internal and external tanks, and discharge pipe means for recovery of fluid leakage from said tanks by gravity and communicating with said first and second annular chambers adjacent the respective lower reaches of said annular chambers and accessible exteriorly of said vessel.

2. A vessel for the storage of liquids or gasses under high pressure according to claim 1 wherein,

* * * * *